Oct. 6, 1931.  J. C. MITCHELL  1,826,321
PIPE JOINT
Filed Sept. 28, 1928
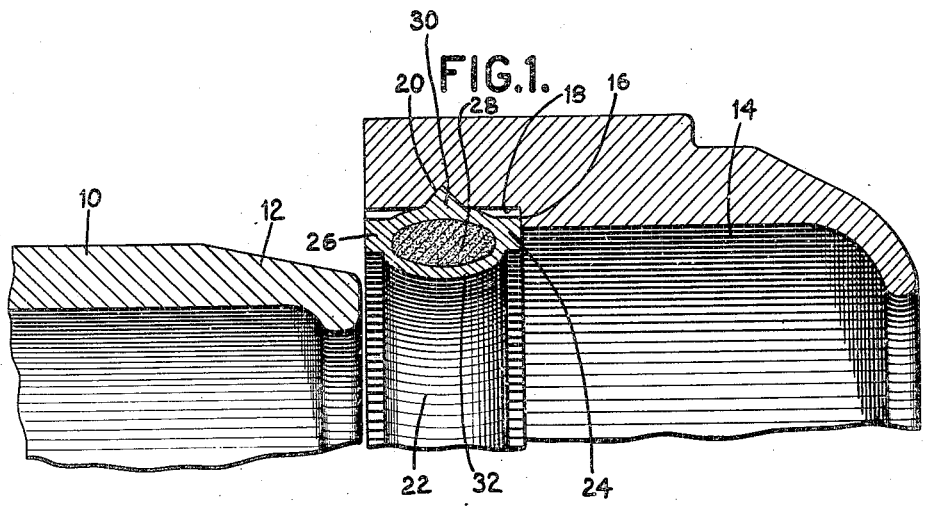
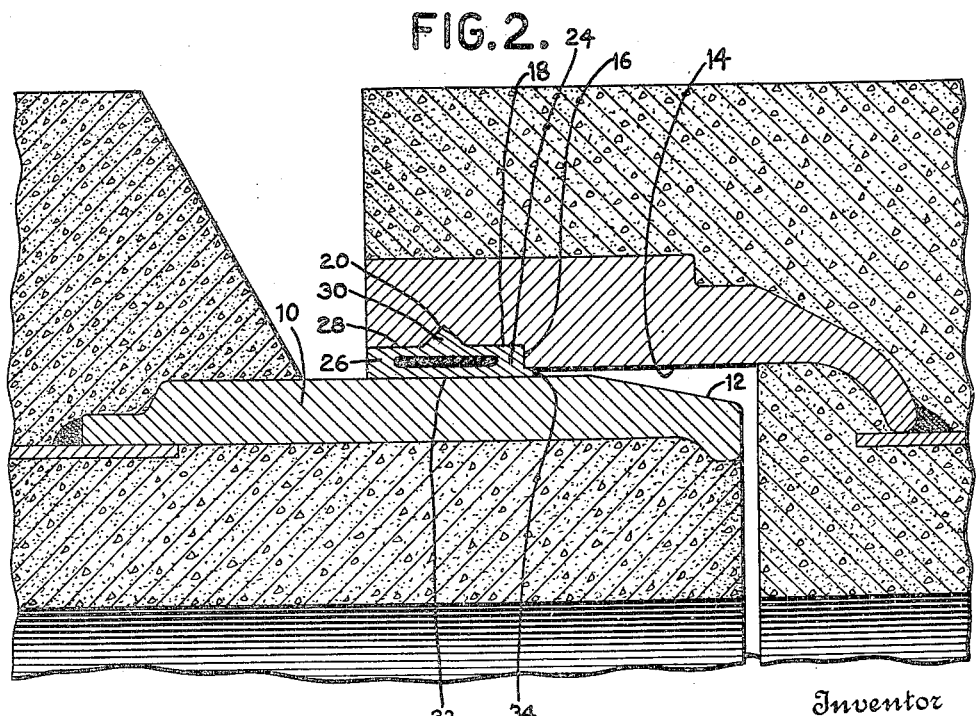
Inventor
J. C. Mitchell
By his Attorneys
Cooper, Kerr & Dunham Patented Oct. 6, 1931

1,826,321

UNITED STATES PATENT OFFICE

JOHN C. MITCHELL, OF BLOOMFIELD, NEW JERSEY, ASSIGNOR TO LOCK JOINT PIPE COMPANY, OF AMPERE, NEW JERSEY, A CORPORATION OF NEW JERSEY

PIPE JOINT

Application filed September 28, 1928. Serial No. 308,920.

This invention pertains to improvements in the pipe joints disclosed in my copending application Serial No. 95,535, filed March 18, 1926, and in Patent No. 1,293,615, issued February 4, 1919, to J. C. Mitchell et al.

The gasket in the above patent is made of ordinary commercial lead pipe filled with resilient fibrous material and flattened to desired thickness. The pipe so prepared is cut to length and the ends fused together to form rings.

Gaskets of the above type were fairly satisfactory in service, but experience taught that for best results, under all conditions of service, the distribution of metal should be changed, particularly to provide metal for hand caulking in case the joint should leak. The form of gasket disclosed in the above mentioned copending application was designed to meet the objections to the plain gasket of the patent, but it has been found that still further improvements may be made.

In the joints of both patent and application a portion of the gasket is forced into a groove formed by a radial abutment plane and a conical surface. If, in either of the previous joints, the spigot is slightly pulled out of the bell by settling of the ground or by a temperature change, the inner end of the lead gasket may be separated from the radial abutment. Under such conditions the conical surface of the gasket will still be in contact with the bell and the joint will remain tight. However, if a subsequent reverse movement takes place and the spigot is pushed back into the bell, the conical surfaces of gasket and bell will be out of contact and the joint may leak. The original separating movement of spigot and bell has decreased the thickness of the conical portion of the gasket, and due to the location of that portion of the gasket and the volume and distribution of metal therein the portion of the resilient core radially adjacent the conical portion is unable to reexpand that portion of the gasket to again fill the groove in the bell. In other words, in the previous designs the parts of the gasket which were principally relied upon to keep the joint tight were located toward an edge of the gasket where there was a surplus of metal and where the resilient material could not work effectively to accomplish its purpose.

An object, therefore, of the present invention is to provide a gasket in which the wedge-shaped portion which enters the circumferential groove of the bell is located at the middle of the gasket, away from the surplus metal at the edges thereof, so that the resilient core will be unhampered in doing its work.

Another object is to provide the bell with a V groove having both surfaces inclined to a radial plane instead of one surface being radial as in the former designs, thereby greatly aiding in maintaining the gasket tight in the groove under shifting action of bell and spigot.

Another object is to provide a gasket having sufficient metal at its inner end to prevent exposure of the core even if considerable metal be carried between the pipe ends.

Another object is to so proportion the parts of gasket and pipe that the caulkable portion of the gasket will not protrude beyond the end of the bell, thereby insuring effective caulking with minimum material and effort, which was not the case with the former design in which it was difficult to force the protruding portion into the space between spigot and bell.

In the present gasket the caulkable metal at the front of the gasket is of the same shape and size as the above mentioned metal provided at the rear of the gasket. The present gasket therefore assumes a symmetrical contour which is easily manufactured and manipulated and which has been found very satisfactory in severe service.

Further and other objects and advantages will be hereinafter set forth in the accompanying specification and claims and shown in the drawings, which by way of illustration show what is now considered to be the preferred embodiment of the invention.

Fig. 1 is a sectional view showing the gasket in position in the bell of a pipe before the spigot is forced into place.

Fig. 2 is the same as Fig. 1 after the joint is made.

The spigot portion of the joint comprises a cylindrical portion 10 and a tapered end portion 12. The bell portion of the joint comprises a cylindrical portion 14 and a gasket receiving portion including an abutment surface 16, a cylindrical surface 18 of greater radius than surface 14, and a circumferential groove 20 formed at the middle of surface 18.

The annular gasket 22 is formed by an extrusion process, with substantially the cross section shown in Fig. 1, having an inner end 24 of solid metal to engage abutment surface 16, an outer end 26 of solid metal which may be caulked by hand after the joint is made, a central hollow portion containing a core 28 of resilient fibrous material, and, opposite the core, a part 30, preferably V shaped, projecting outwardly into groove 20 and of such shape as to substantially fill groove 20 even before the gasket is compressed. In normal uncompressed condition the metallic wall 32 on the opposite side of the core from projection 30 bellies outwardly to form the core cavity.

When the spigot is forced past the gasket into the bell the gasket section assumes the shape shown in Fig. 2. Wall 32 has been forced radially outwardly, core 28 has been compressed, projection 30 has been tightly wedged into groove 20, metal 18 has been forced against abutment 16, and metal 26 projects in position to be caulked and to serve as an indicator or tell-tale as to whether or not the gasket has been properly seated. Resilient core 28 serves constantly, after the joint is made, to maintain the outer and inner walls of the gasket in contact with bell and spigot respectively. Projection 30 is an integral part of the outer gasket wall, therefore 30 is held resiliently in groove 20. Some of the metal 18 has been forced past abutment 16, as at 34, but inasmuch as there is a considerable volume of metal at 18, the loss of metal 34 does not expose core 28 nor otherwise impair the efficiency of the joint.

It is to be understood that the invention is not limited to the construction herein specifically illustrated but can be embodied in other forms without departure from its spirit, as defined by the appended claims.

I claim—

1. In a pipe joint, in combination, a spigot pipe, a bell pipe having an interior circumferential recess and a circumferential groove extending radially outwards from said recess near the middle of the length thereof, and an annular gasket of ductile material adapted to occupy said recess and having a circumferential projection adapted to substantially fill said groove while said gasket is in normal uncompressed condition, and a resilient core in said gasket arranged opposite said projection whereby when said gasket is compressed into said recess by the forcible entry of said spigot into said bell, said core will act to resiliently maintain said projection in said groove.

2. In a pipe joint of the kind described, a bell pipe, a spigot pipe, said bell pipe having an internal circumferential groove therein, an annular gasket adapted to extend substantially equal axial distances on both sides of said groove, a circumferential projection on the outer surface of said gasket and adapted to fill said groove while the gasket is in normal uncompressed shape, and a resilient annular core completely embedded in the middle of said gasket whereby when said gasket is flattened within the bell by the forcible insertion of the spigot pipe, said core will resiliently maintain said projection in said groove.

3. In a pipe joint, the combination of a bell pipe end having a cylindrical recess coaxial with the bore of the pipe and terminating at its inner end in a circumferential abutment, and having a circumferential groove in the wall of said recess at the middle of its length; a spigot pipe end having a tapered front section and a cylindrical portion back of said front section; and a deformable, compressible, tubular, annular gasket seated in said recess and groove in said bell end and adapted to be held flattened and compressed between the said cylindrical surfaces, and to be crowded forwardly against said abutment and outwardly radially into said groove, by the forcible insertion of the spigot into the bell end, said gasket being provided with a surplus of material at both edges thereof so that when the gasket is crowded forwardly against the abutment some of the material may be carried past the abutment without uncovering the resilient core of the gasket and the surplus of material on the forward edge may be hand caulked, and a resilient core within the gasket adapted when the gasket is compressed to resiliently hold said gasket in the groove.

4. In a pipe joint the combination with a spigot pipe, a bell pipe having a circumferential groove extending radially outwardly from the inner surface of the bell, of an annular tubular gasket of ductile material adapted to fit within said bell and having a circumferential rib substantially filling said groove while said gasket is in normal uncompressed condition and a resilient core in said gasket of substantially oval shape and having its maximum thickness radially arranged opposite said projection whereby when the gasket is compressed in said bell by the forcible entry of the spigot into said bell said core will exert its maximum expansive effort to hold the rib in said groove.

In testimony whereof I hereto affix my signature.

JOHN C. MITCHELL.